Aug. 31, 1937.                W. T. PEASE                2,091,374
                           THREAD CLEANING NUT
                           Filed Nov. 9, 1935         2 Sheets-Sheet 2

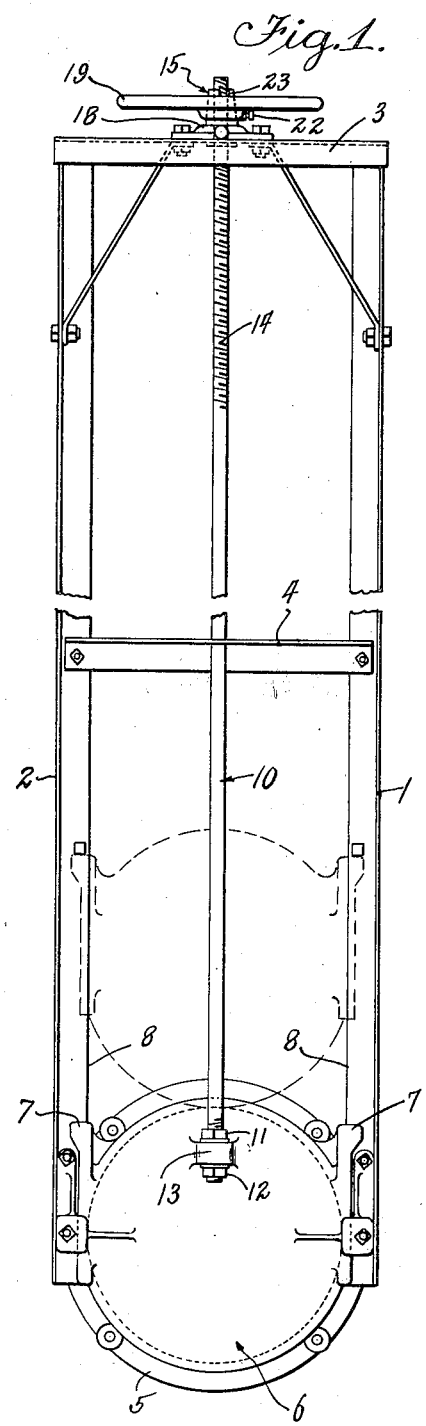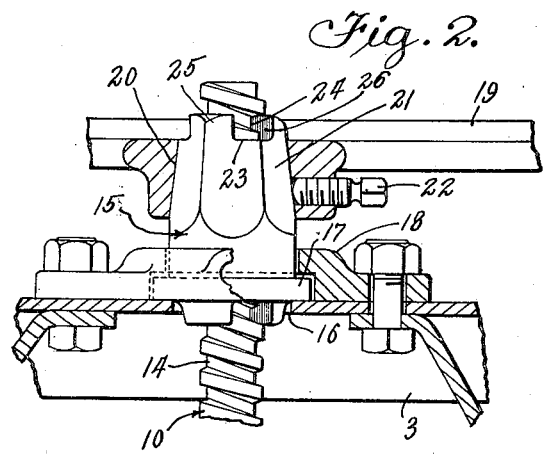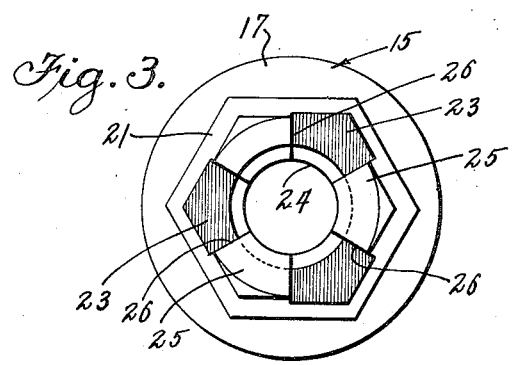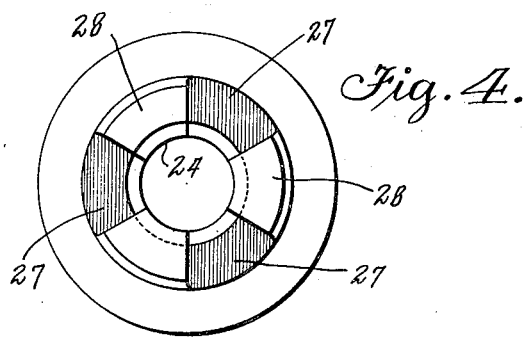

INVENTOR.
William T. Pease
BY Lyon & Lyon
ATTORNEYS

Patented Aug. 31, 1937

2,091,374

UNITED STATES PATENT OFFICE 2,091,374

THREAD CLEANING NUT

William T. Pease, Huntington Park, Calif., assignor to Snow Manufacturing Co., Los Angeles, Calif., a corporation of California Application November 9, 1935, Serial No. 49,057

7 Claims. (Cl. 74—424.8)

My invention relates to thread and nut constructions and has particular reference to a nut construction which has the effect of cleaning the threads of the member upon which the nut operates during the ordinary manipulation of the nut upon the thread.

It frequently occurs that bolts, operating rods, and similar devices provided with threads upon which operate threaded nuts, are exposed to conditions which permit accumulations of dust, dirt, debris or corroded materials upon the thread of the bolt or threaded rod, making it difficult to move the nuts that are threaded thereon without the exertion of extreme force and without danger of tearing or stripping the threads of either the bolt or the rod or the nut thereon.

This condition exists particularly in the operation of valves and similar devices in irrigation systems wherein the valves are operated at infrequent intervals so that the threaded operating rods are exposed to the atmosphere and to the effects of dust and debris over considerable periods of time permitting the accumulation in the threads of a deposit of hardened dirt or particles of corroded metal interfering with the ease of operation of the nut constructions employed to move the valve gates to their open or closed positions.

It is, therefore, an object of my invention to provide nut constructions for application to threaded rods or bolts so exposed which will embody in the nut construction cleaning means which pass over the threads of the rod or bolt in advance of the main threaded body of the nut to clean or remove the dirt or debris from the threads and thus facilitate the easy manipulation of the nut construction over the rod.

Another object of my invention is to provide a nut construction for threaded rods or bolts in which a portion of the nut construction constitutes in effect a cleaning die which cleans the thread in advance of the movement of the main threaded portion of the nut over the threads of the bolt or rods.

Another object of the invention is to provide a construction wherein a plurality of radially extending slots are formed in either end of the nut extending into the threaded portion thereof, the space formed by such slots constituting a cleaning space permitting dirt and debris to fall away from the bolt or threaded rod without entering the main threaded body of the nut.

Other objects and advantages of the invention will be apparent from a study of the following specifications, read in connection with the accompanying drawings, wherein Figure 1 is an elevational view of an irrigation gate employing a threaded operating rod and a nut constructed in accordance with my invention;

Figure 2 is a detail view of the upper end of the gate construction shown in Figure 1, illustrating the threaded rod and nut construction constituting the operating means for the gate;

Figure 3 is a top plan view of the nut shown in Figure 2;

Figure 4 is a bottom plan view of the nut shown in Figure 2;

Figure 5:
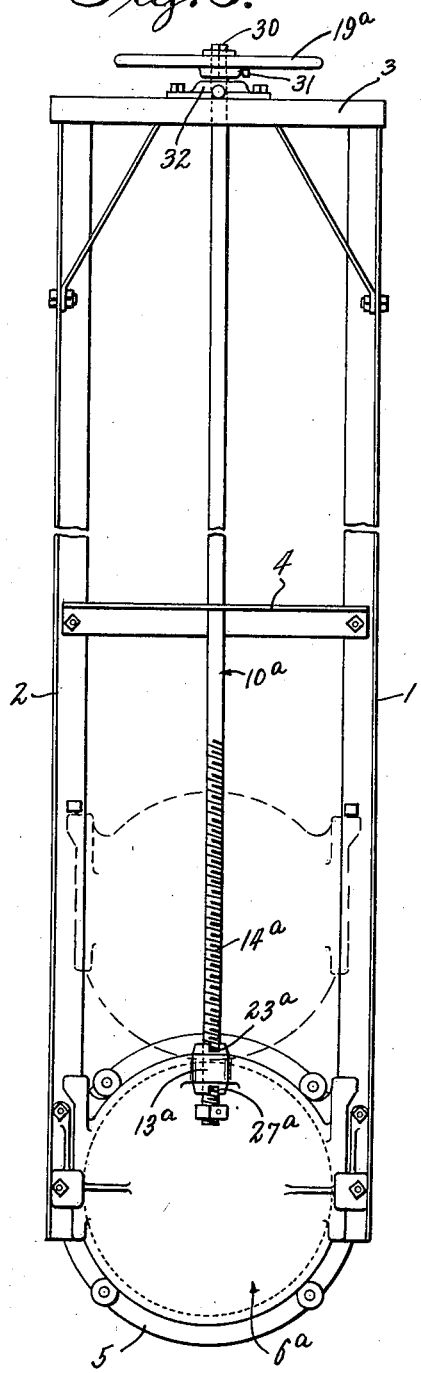
Figure 5 is a vertical elevational view of a modified form of the gate employing my self-cleaning nut construction.

Referring to the drawings, I have illustrated my invention as embodied in an operating mechanism for an irrigation gate, which gates, as will be understood by those skilled in the art, may be constructed as illustrated in Figure 1 of a suitable frame comprising side rails 1 and 2 which may be formed of angled iron or steel. These rails 1 and 2 may be interconnected at their upper ends by means of a cross bar 3 while one or more suitable cross braces 4 may be employed along the length of the rails to hold them properly spaced. The lower ends of the rails 1 and 2 are usually interconnected by means of a suitable gate seat frame 5 defining the opening to be closed by a gate valve 6.

Suitable shoes 7 are formed upon the gate valve 6, engaging the inwardly projecting webs 8 of the rails 1 and 2 to constitute guides along which the gate valve 6 may be elevated to gate-open position, or lowered to the full line position shown in Figure 1, representing the closed position of the gate valve.

The means employed to raise and lower the gate valve 6 may be of any suitable construction, though such means is usually constituted by an operating rod 10 which extends parallel to the rails 1 and 2 and usually spaced midway therebetween. The lower end of the operating rod 10 is provided with a pair of nuts 11 and 12 engaging the opposite sides of an outwardly projecting boss 13 formed upon the gate valve 6, while the upper end of the rod 10 is threaded as indicated at 14 to be engaged by a threaded nut 15 by which the rod 10 is elevated and lowered, to thereby lift and lower the gate valve 6.

By referring particularly to Figure 2, it will be observed that the cross bar 3 has an opening 16 therein of considerably larger diameter than the rod 10 through which the operating rod 10 projects, while the nut 15 is provided with an outwardly projecting flange 17 seated upon the upper surface of the cross bar 3 and held in this relation by means of a cap 18. The nut 15 may have an operating handwheel 19 formed integrally therewith or formed as a separate member, as is illustrated in Figure 2. The handwheel 19 is illustrated as having a tapered hexagonal opening 20 therein adapted to seat upon a tapered hexagonal exterior surface 21 formed upon the exterior of the nut 15, the handwheel being held in place upon the nut 15 by means of a set screw 22.

As will be understood by those skilled in the art, the nut 15 is provided with internal threads adapted to engage the threads 14 upon the operating rod so that by rotating the handwheel 19 and the nut 15 in one direction the rod 14 will be moved downwardly, while reverse rotation of the handwheel 19 and the nut 15 will cause the rod 10 to be elevated.

As hereinbefore explained, when this threaded rod and nut construction is employed upon irrigation valves and similar devices exposed to the effects of dust or dirt, considerable difficulty has been encountered in moving the nut and hand wheel due to the collection of dirt in the threads of the operating rod, which, as these threads engage the threads of the nut, become compacted therein, preventing ready relative rotation of the rod and nut, and, frequently causing breakage of either the nut or the rod. This difficulty may be overcome by forming a plurality of radial slots 23 in the upper surface of the nut body, extending into the threaded interior bore 24 of the nut so that the material remaining between the radial slots forms one or more interrupted thread members, which constitutes a die portion of the nut, the dies 25 which engage the threads 14 of the rod and clean them of dirt or accumulation. The slots 23 are preferably formed of considerable area so that ample space is provided between the die members 25 preferably about one-sixth of the circumference of the threaded bore as illustrated herein to permit the accumulations which are cut or scraped from the threads 14 to readily fall away from the rod and thus be effectively removed from the remaining or main threaded body portion of the nut 15. While the depth of the slots may be varied, it is believed to be most desirable that they shall extend longitudinally of the nut past at least one full thread thereof to thereby employ one full thread for the cleaning die portion of the nut.

While the slots 23 may be formed of any suitable configuration, I prefer that the advancing face 26 of the die portions 25 of the nut, as the nut is screwed upwardly on the rod, lie along radii emanating from the center of the nut, that is, the advancing faces 26 shall extend along planes parallel to and intersecting to the axis of rotation of the nut, such construction producing the greatest cutting or cleaning effect.

Similarly the lower surface of the nut 15 is provided with a plurality of radially extending slots 27 the material between which constitutes cleaning dies 28, the advancing surfaces of which, as the nut is screwed down upon the rod 10, lie at right angles to the axis of rotation of the nut, presenting the most effective cutting or cleaning surface to the threads 14.

In Figure 5 I have illustrated an irrigation gate valve similar to that shown in Figure 1, but in which, instead of the nut being associated with the upper end of the operating rod, in this instance the nut is formed upon the gate valve and the gate valve is raised and lowered while the rod is held against vertical movement.

Figure 6:
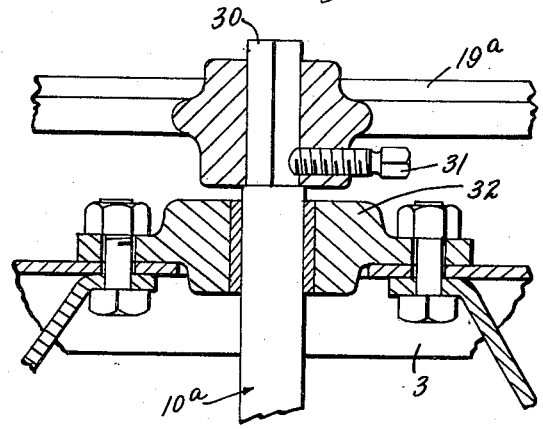
Figure 6 is a detail sectional view of the upper end of the gate construction shown in Figure 5, illustrating the attachment of the handwheel to the operating rod.

The gate valve construction illustrated in Figure 5 includes the frame formed of the side rails 1 and 2 interconnected by cross bars 3 and 4 and by the gate seat 5 as was illustrated and described with reference to Figure 1. The gate valve 6a, however, is formed with an outwardly extending boss 13a which is threaded to receive the threads 14a of the operating rod 10a so that as the rod 10a is rotated the gate 6a will be raised and lowered on the rod. The upper end of the rod 10a is provided with a handwheel 19a which may be secured to a squared shank 30 formed upon the upper end of the rod 10a, the handwheel being held in place by suitable set screw 31. The upper end of the rod 10a projects through a suitable bearing 32 secured to the upper surface of the cross bar 3 as indicated in Figure 6.

Figure 7:
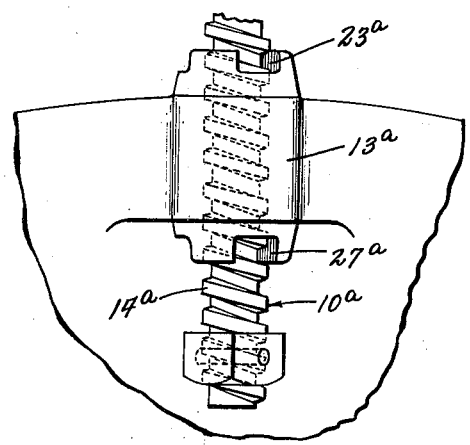
Figure 7 is a detail enlarged sectional view of the nut construction illustrated in Figure 5.

As is illustrated in detail in Figure 7, the threaded boss 13a constitutes a nut engaging the threads 14a of the operating rod 10a so that the self-cleaning features of the nut 15 described with reference to Figure 1, may be readily adapted to the threaded boss or nut 13a by forming the radial slots 23a and 27a upon the upper and lower surfaces, respectively, of the nut structure 13a.

It will be observed that I have provided a self-cleaning means upon a nut structure which may be adapted to any type of nut or other member which threadedly engages a bolt or operating rod.

While I have shown and described the preferred embodiment of my invention, I do not wish to be limited to any of the details of construction shown herein, except as defined in the appended claims.

I claim:

1. In a self-cleaning nut construction, a nut member having a threaded bore extending longitudinally therethrough and a plurality of radial slots extending into the end of said nut structure and communicating with the interior bore, said slots being distributed about said bore and at least one side edge of each of said slots extending along a radius emanating from the center of said bore, whereby the material of the nut member adjacent said slot constitutes a die for cleaning the threads upon which said nut operates.

2. In a self-cleaning nut construction, a nut member having a threaded bore extending longitudinally therethrough and a plurality of radial slots extending into each end of said nut structure and communicating with the interior bore, said slots being distributed about said bore, each having one of its edges disposed along a line emanating from the center of said bore, whereby the material of the nut member adjacent said slot constitutes a die for cleaning the threads upon which said nut operates.

3. In a self-cleaning nut construction, a nut member having a threaded bore extending longitudinally therethrough, a cleaning die formed upon each end of said nut structure comprising a plurality of sector shaped radial slots extending into the end of the nut member and communicating with the threaded bore thereof, the surface of the material at one side of each of said slots extending in a plane parallel to and intersecting the axis of rotation of said nut whereby said surface constitutes a cleaning die for cleaning the threads upon which said nut operates.

4. In a self-cleaning nut construction, a nut member having a threaded bore extending longitudinally therethrough and a plurality of radial slots of relatively large area extending into the end of said nut structure and communicating with the interior bore, said slots being evenly distributed about said bore and one edge of each of said slots extending in a plane parallel to and intercepting the axis of rotation of said nut member whereby the material of the nut member adjacent said slot constitutes a die for cleaning the threads upon which said nut operates.

5. In a self-cleaning nut construction for use on a threaded rod, a nut member having a body portion through which extends a threaded bore adapted to be screwed onto and off of said threaded rod and having a die portion at the end thereof which advances along said rod as said nut is screwed thereon, comprising a plurality of sector shaped, radially extending slots communicating with said threaded bore, at least one edge of each of said slots extending along a line emanating from the center of said bore, the material of said nut body lying between the slots acting as cutting dies, cleaning the threads of said rod as the nut advances therealong.

6. In a self-cleaning nut construction for use on a threaded rod, a nut member having a body portion through which extends a threaded bore adapted to be screwed onto and off of said threaded rod and having a die portion at each of its ends, comprising a plurality of sector shaped, radially extending slots communicating with said threaded bore, at least one edge of each of said slots extending along a line emanating from the center of said bore, the material of said nut body lying between the slots acting as cutting dies, cleaning the threads of said rod as the nut advances therealong.

7. In a self-cleaning nut construction for use on a threaded rod, a nut member having a threaded longitudinal bore extending therethrough adapted to be screwed onto and off of said threaded rod, a thread cleaning die structure formed upon each of the ends of said nut member, comprising a plurality of sector shaped slots extending into the end face of said nut member, the edges of said slots being disposed upon radii emanating from the center of said bore whereby the material of said nut member lying between said slots constitutes a die engaging and cleaning the threads of said rod prior to the entry of said threads into the body of said nut member.

WILLIAM T. PEASE.